United States Patent
Hong et al.

(10) Patent No.: US 7,456,633 B2
(45) Date of Patent: Nov. 25, 2008

(54) APPARATUS FOR AND METHOD OF MEASURING COMPOSITION AND PRESSURE OF THE DISCHARGED GAS FROM ION GAUGE USING RESIDUAL GAS ANALYZER

(75) Inventors: Seung Soo Hong, Daejeon (KR); Kwang Hwa Chung, Daejeon (KR); Yong Hyeon Shin, Daejeon (KR)

(73) Assignee: Korean Research Institute of Standards and Science, Daejeon (KR)

( * ) Notice: Subject to any disclaimer, the term of this patent is extended or adjusted under 35 U.S.C. 154(b) by 0 days.

(21) Appl. No.: 11/551,708

(22) Filed: Oct. 21, 2006

(65) Prior Publication Data
US 2008/0048663 A1 Feb. 28, 2008

(30) Foreign Application Priority Data
Aug. 23, 2006 (KR) .................. 10-2006-0079797

(51) Int. Cl.
*G01L 21/30* (2006.01)
*G01N 27/62* (2006.01)

(52) U.S. Cl. .................. 324/460; 324/464; 324/459
(58) Field of Classification Search .................. 324/464, 324/460, 468, 470, 462, 459
See application file for complete search history.

(56) References Cited

U.S. PATENT DOCUMENTS

| | | | | |
|---|---|---|---|---|
| 3,174,036 A | * | 3/1965 | Alexeff | .................. 250/372 |
| 3,498,105 A | * | 3/1970 | Hetherington | .................. 73/19.02 |
| 3,573,523 A | * | 4/1971 | Reich et al. | .................. 313/7 |
| 3,578,758 A | * | 5/1971 | Altshuler | .................. 73/40.7 |
| 5,301,537 A | * | 4/1994 | Atkinson | .................. 73/40 |
| 6,054,862 A | * | 4/2000 | Zhou | .................. 324/464 |
| 6,881,952 B2 | * | 4/2005 | Kim | .................. 250/300 |
| 7,053,589 B2 | * | 5/2006 | Gabrys et al. | .................. 74/572.1 |
| 2005/0017634 A1 | * | 1/2005 | Kamio et al. | .................. 313/553 |
| 2005/0109947 A1 | * | 5/2005 | Turner et al. | .................. 250/397 |

OTHER PUBLICATIONS

Seung-Soo Hong et al., Investigation of gas species in a stainless steel ultrahigh vacuum chamber with hot cathode ionization gauges, Measurement Science and Technology 15, 2004, pp. 359-364, Institute of Physics Publishing, Online:stacks.iop.org/MST/15/359 (DOI: 10.1088/0957-0233/15/2/007), UK.

* cited by examiner

*Primary Examiner*—Diego Gutierrez
*Assistant Examiner*—John Zhu
(74) *Attorney, Agent, or Firm*—DeMont & Breyer LLC

(57) ABSTRACT

Disclosed herein are an apparatus for and method of measuring the composition and the pressure of the discharged gas from an ion gauge by using a residual gas analyzer. In this regard, there are provided a vacuum container 200 divided into a pressure container 210 and a discharge container 220 by means of a partition 235 having an orifice 230 formed thereon; an ion gauge 100 mounted at the pressure container 210 side of the vacuum container 200 for discharging the gas at the time of vacuum formation; a residual gas analyzer 240 mounted at the pressure container 210 side of the vacuum container 200 for measuring the composition and the pressure of the residual gas; pump means disposed at one side of the discharge container 220 of the vacuum container 200 for discharging the inside gas; and heating means disposed at the vacuum container 200 for heating the vacuum container 200 to a predetermined temperature.

7 Claims, 3 Drawing Sheets

APPARATUS FOR AND METHOD OF MEASURING COMPOSITION AND PRESSURE OF THE DISCHARGED GAS FROM ION GAUGE USING RESIDUAL GAS ANALYZER

BACKGROUND OF THE INVENTION

1. Field of the Invention

The invention relates to an apparatus for and method of measuring the composition and the pressure of the discharged gas from a hot cathode ion gauge mounted to a container of an ultra high vacuum ($<10^{-7}$ Pa) using a residual gas analyzer.

2. Background of the Related Art

In general, an ion gauge employed in the high-tech display or semiconductor fabrication process is a pressure sensor, which is used in the measurement of the pressure in high vacuum or ultra high vacuum.

FIG. 1 is a schematic cross-sectional view showing the principle of a hot cathode ion gauge used in the present invention. As shown in FIG. 1, a main body 106 is formed of transparent glass or metal material, and a filament 104 is provided at the inside thereof.

A vacuum port 112 is a constitutional portion to be connected to a pressure container 210, and an ion collector 108 is hanged by extension from the upper portion of the center thereof.

A filament 104 is provided at one lower side of the main body 106, and a grid electrode wire 110 is provided at the other lower side. Also, a third direct current source 140 and a variable resistor 142 are respectively connected to both ends of the filament 104, and a second direct current source 144 with 175V is connected to the electrode wire 110. A first direct current source 146 with 25V is connected between the variable resistor 142 and the second direct current source 144.

An amplifier 120 is connected to an ion collector 108, and a pressure gauge 125 is connected to the amplifier 120 in series.

Hereinafter, the principle of measuring the pressure of the gas in accordance with the ion gauge 100 constructed as above will be described below.

When the vacuum is generated in the ion gauge 100 through the vacuum port 112, a very rare number of gas molecules are existed in the ion gauge 100.

In this instance, thermo-electrons 114 discharged by the current flowing through the filament 104 collide with the gas molecules to thereby produce ions 118. The produced ions 118 are collected in the ion collector 108 to thereby generate minute electric current in proportion as the number of the ions collected. The amplifier 120 reacts to amplify minute electric current outputted as described above, and the pressure gauge 125 denotes the inside pressure of the ion gauge 100 in proportion as the amplified electric current signal.

With regard to the conventional hot cathode ion gauge, several problems were existed as follows. In other words, when the ion gauge 100 is under the ultra high vacuum ($<10^{-7}$ Pa), there occurred a phenomenon of the discharge of the gas from the ion gauge 100 itself. The gas discharged from the ion gauge 100 causes grounds of contaminating the vacuum container or increasing the pressure, so that it was difficult to measure the vacuum pressure accurately.

By this time, it was impossible to anticipate the effect of the gas, because it was impossible to know the kind and volume of the gas (i.e., pressure) discharged from the hot cathode ion gauge quantitatively. Accordingly, it was impossible to antici-pate the effect of the contaminated process caused by the discharged gas of the ion gauge 100 on the quality and durability of the products.

Especially, because the gas discharged from the ion gauge, which was indispensable to measure the ultra high vacuum in the high-tech vacuum processes such as those employed in the fabrication of the semiconductor or the display, reacted with other gas in the process or increased the pressure of the gas, so that these gases caused grounds of reducing the capacity or the durability of the products.

SUMMARY OF THE INVENTION

Therefore, the present invention has been made in view of the above problems occurring in the prior art, and it is a primary object of the present invention to provide an apparatus for and method of measuring the composition and pressure of the discharged gas from an ion gauge by using a residual gas analyzer, which enables to measure the accurate vacuum pressure by measuring the kind and volume of the gas discharged from the ion gauge indispensable to the fabrication process of the semiconductor or the high-tech display device.

Second object of the present invention is to provide an apparatus for and method of measuring the composition and the pressure of the discharged gas from an ion gauge by using a residual gas analyzer, which enables to prevent unexpected chemical reaction in the process by measuring the kind and volume of the discharged gas, to protect devices of other process, and to improve the quality of the fabricated products.

To achieve the above objects of the present invention, there is provided an apparatus for measuring the composition and the pressure of the discharged gas from an ion gauge by using a residual gas analyzer, the measuring apparatus comprising a vacuum container 200 divided into a pressure container 210 and a discharge container 220 by means of a partition 235 having an orifice 230 formed thereon;

an ion gauge 100 mounted at the pressure container 210 side of the vacuum container 200 for discharging the gas at the time of vacuum formation;

a residual gas analyzer 240 mounted at the pressure container 210 side of the vacuum container 200 for measuring the composition and the pressure of the residual gas;

pump means disposed at one side of the discharge container 220 of the vacuum container 200 for discharging the inside gas; and heating means disposed at the vacuum container 200 for heating the vacuum container 200 to a predetermined temperature.

Furthermore, it is preferable that the ion gauge 100 is comprised of a plurality of ion gauges 100a, 100b, and each of which can be turned on and off separately.

Also, it is preferable that the ion gauges 100, 100a, 100b are of a hot cathode ion gauge, the heating means is an electric heating heater, and heats the vacuum container 200 so that it is within a range of 150° C. to 250° C.

Furthermore, it is preferable that the pump means comprise a turbomolecular pump 260 connected at the discharge container 220 side, and a rotary pump 280 connected at the turbomolecular pump 260 in series, wherein the turbomolecular pump 260 has a volume capable of maintaining the inside pressure of the vacuum container 200 at less than $1\times10^{-5}$ Pa, and the rotary pump 280 has a volume capable of maintaining the inside pressure of the vacuum container 280 at less than 1 Pa.

Also, it is preferable that a diameter of the orifice 230 formed on the partition 230 is 10 mm, when a diameter of the vacuum container 200 is 250 mm.

Furthermore, the inside of the vacuum container 200 is divided so that the pressure container 210 is positioned at the upper side and the discharge container 220 is positioned at the lower side, and the vacuum container 200 and the partition 235 are made of stainless steel material.

In addition, in the present invention, the ion gauges are of a hot cathode ion gauge.

In order to achieve the above objects, according to another aspect of the present invention, there is also provided a method of measuring the composition and the pressure of the discharged gas from an ion gauge by using a residual gas analyzer, the method comprising:

an initial step S100 of discharging a vacuum container 200, which is divided into a pressure container 210 and a discharge container 220 at the inside by a partition 235 formed with an orifice 235, by means of pump means, so that a vacuum degree achieved becomes less than $1\times10^{-5}$ Pa;

a step S110 of removing the moisture and the contamination material by heating the vacuum container 200 to 200° C. by using heating means mounted at the vacuum container 200;

a step S120 of cooling the vacuum container 200 to a room temperature, so that the vacuum degree achieved becomes less than $1\times10^{-7}$ Pa;

a step S130 of measuring the composition and the pressure of the gas in the pressure container 210 by turning on the residual gas analyzer 240 mounted at the pressure container 210 side of the vacuum container 200;

a step S140 of discharging the gas from the ion gauge 100 by turning on the ion gauge 100 mounted at the pressure container 210 side of the vacuum container 200; and a step S150 of measuring the composition and the pressure of the discharged gas by using the residual gas analyzer 240.

In addition, the steps ranging from the initial step S100 to the measuring step S150 can be repeated as many times as they are required.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 3 is a graphic view showing the composition and the pressure of the gas discharged when the first and second ion gauges 100a, 100b are turned on.

DETAILED DESCRIPTION OF THE PREFERRED EMBODIMENT

Reference will now be made in detail to the preferred embodiment of the present invention with reference to the attached drawings.

Figure 1:
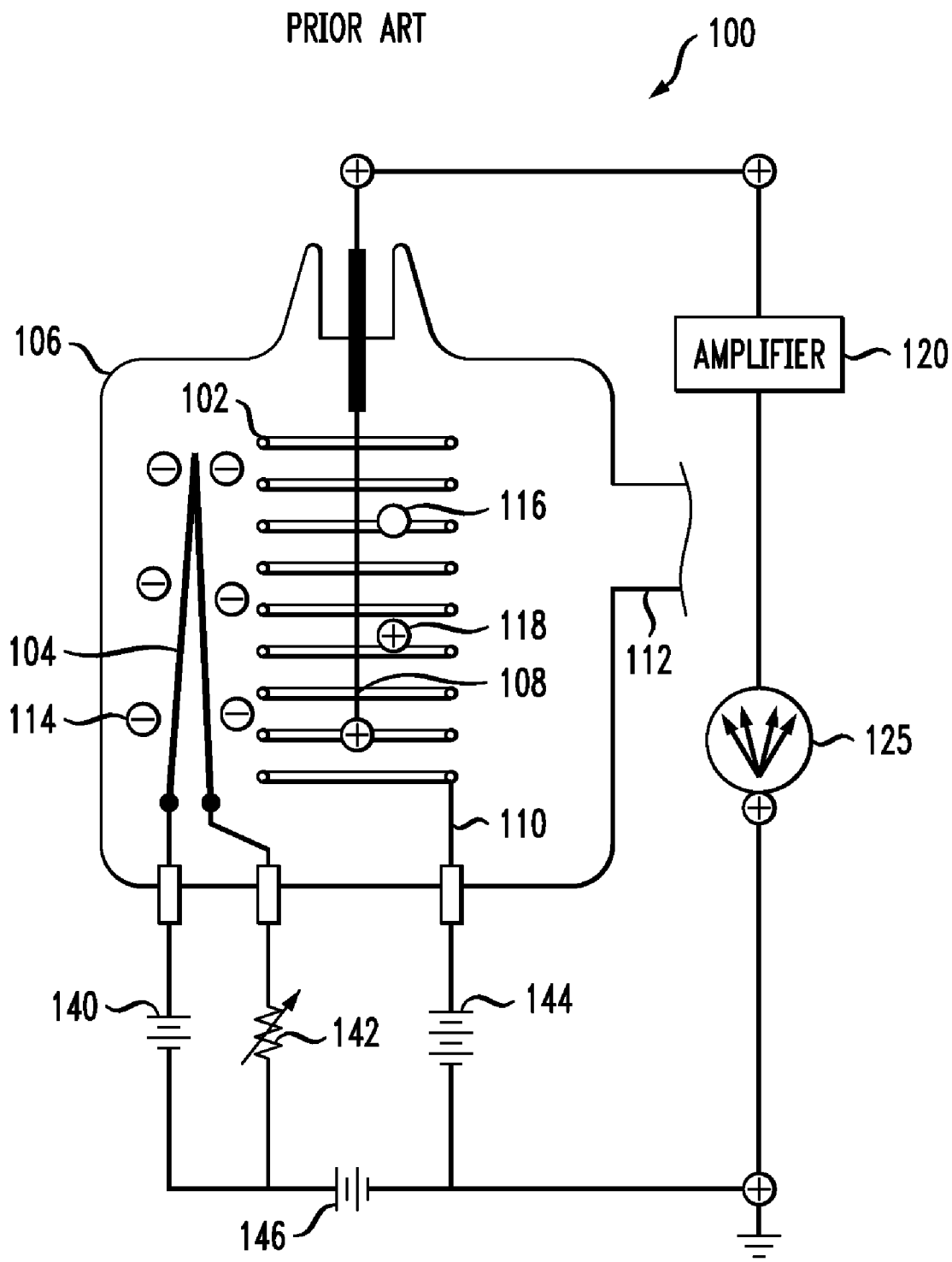
FIG. 1 is a schematic cross-sectional view showing a principle of a hot cathode ion gauge used in the present invention.
Figure 2:
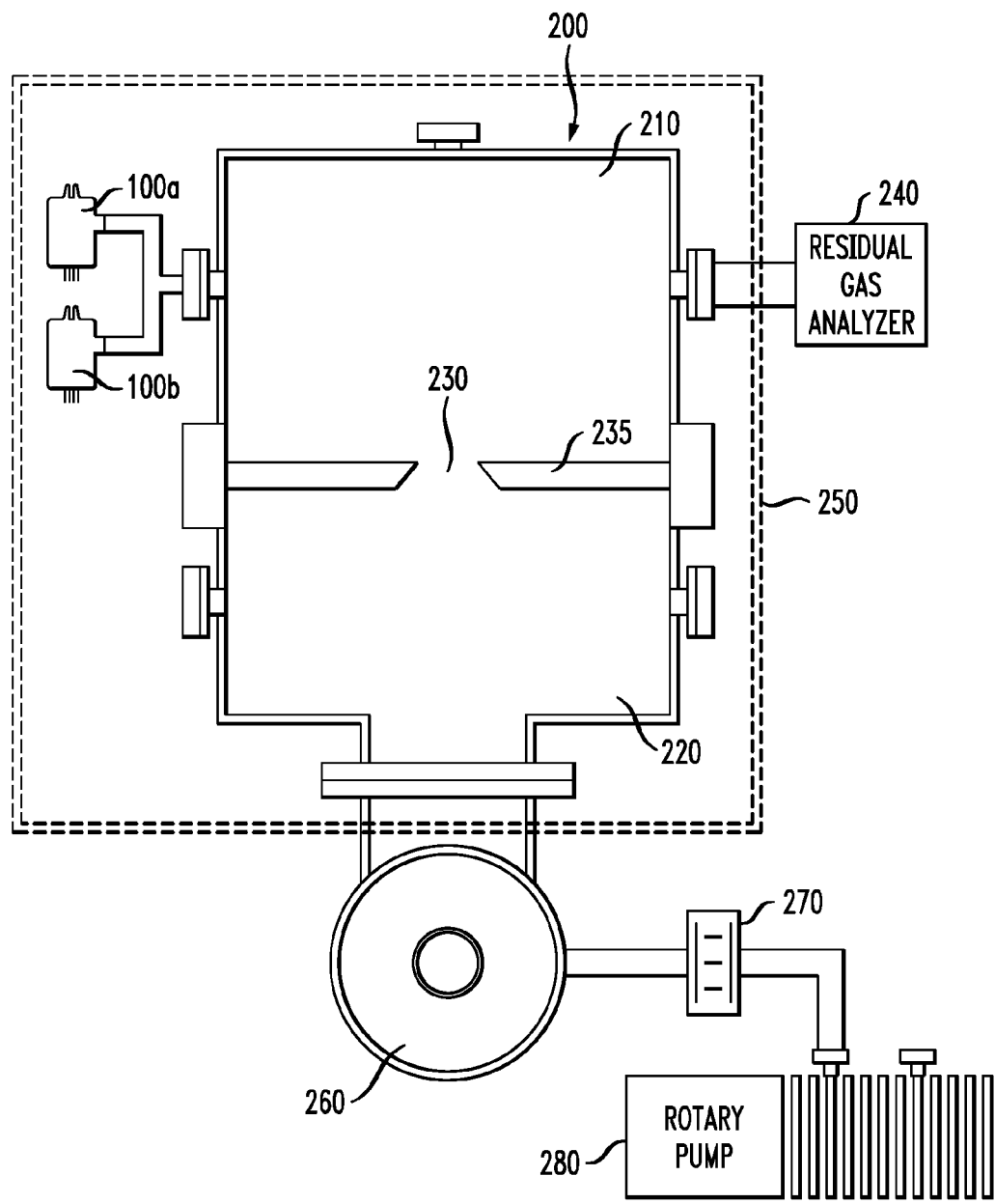
FIG. 2 is a schematic cross-sectional view showing the apparatus for measuring the composition and the pressure of the discharged gas according to the present invention.

FIG. 2 is a schematic cross-sectional view showing the apparatus for measuring the composition and the pressure of the discharged gas according to the present invention. As shown in FIG. 2, the constitution of the present invention can be largely divided into a vacuum container 200 and peripherals.

The vacuum container 200 is made of stainless steel material in order to prevent the discharge of the gas and is formed of cylindrical shape having a diameter of about 250 mm. The inside of the vacuum container 200 is divided into an upper pressure container 210 and a lower discharge container 220 by means of a partition 235. The partition 235 is made of stainless steel material as is the vacuum container 200, and is formed with an orifice 230 penetrating through the center thereof and with a diameter of about 10 mm. When the diameter of the orifice 230 is too large, it is impossible to achieve safe pressure due to the increase of the conductance between the pressure container 210 and pumps 260, 280, and when the diameter is too small, such problems occur as much time is required to the discharge and the vacuum formation, and excessive load is applied to the pumps 260, 280.

Accordingly, it is required to produce safe pressure in the pressure container 210 by decreasing the conductance between the pressure container 210 and the pumps 260, 280 to thereby reduce the discharge speed of the pumps.

Furthermore, a residual gas analyzer 240 and an ion gauges 100a, 100b are mounted around the pressure container 210. The residual gas analyzer (RGA) 240 is mounted at the outer circumferential surface of the pressure container 210 to measure the composition and the pressure of the residual gas.

Also, a turbomolecular pump 260 and a rotary pump 280, which are pump means, are connected to the lower portion of the discharge container 220.

The outer surface of the vacuum container 200 is wholly encircled by a heating plate 250. The heating plate 250 is used to bake out the vacuum container 200 to thereby remove the moisture and the contamination material in the pressure container. An electric heating heater can be a representative embodiment of the heating plate 250. Furthermore, the heating plate 250 can be controlled to maintain a predetermined temperature (for instance, 200° C.) by a feed-back controlling, although not shown in the drawing.

The first ion gauge 100a and the second ion gauge 100b are connected in parallel with the pressure container 210, and they can be turned on and off separately. It is preferable that the ion gauge is selected to be a hot cathode ion gauge.

The turbomolecular pump 260 is connected to the discharge container 220 at the suction side and has a volume capable of producing a high vacuum of about $1\times10^{-5}$ Pa. The rotary pump 280 is connected at the discharge side of the turbomolecular pump 260 in series, and has a volume capable of producing a low vacuum of 1 Pa. A trap 270 is mounted at a connection portion of the turbomolecular pump 260 and the rotary pump 280.

Hereinafter, the operation method of the measuring apparatus in accordance with the present invention as constructed above will be described in connection with the appending drawings below.

(Operation Method)

At first, the vacuum degree achieved in the inside of the vacuum container 200 is made less than $1\times10^{-5}$ Pa by driving the turbomolecular pump 260 and the rotary pump 280 (S100).

Then, the moisture and the contamination material is removed by heating the vacuum container 200 to a temperature range of 150° C. to 250° C., preferably to 200° C., by using the heating plate 250 (S110).

Next, The vacuum container 200 is cooled to the room temperature, resulting in the vacuum degree of less than $1\times10^{-7}$ Pa (S120). This is achieved by using a principle that the vacuum degree can be further increased by discharging and cooling the gas (including the moisture) volume-expanded and the evaporated impurities through the heating via the pump. The heating temperature is selected to be within a range of 150° C. to 250° C., because much time is consumed in the evaporation of the moisture and the vacuum degree is not increased greatly when the vacuum container is cooled, if it is heated under the temperature of 150° C., and if the vacuum container is heated above 250° C., temperature load is exerted on the other experimental devices, resulting in the capacity reduction, or such heating can surpass the required level.

Then, the composition and the pressure of the gas in the pressure container 210 are measured by operating the residual gas analyzer 240 mounted at the pressure container 210 side of the vacuum container 200 (S130).

Next, the first ion gauge 100a mounted at the pressure container 210 side of the vacuum container 200 is turned on to thereby discharge the gas from the ion gauge 100a (S140).

Then, the composition and the pressure of the discharged gas are measured by using the residual gas analyzer 240 (S150).

The above described steps from the initial step S100 to the measurement step S150 can be repeated and measured as many times as they are required. Furthermore, identical experiments can be repeated by turning off the first ion gauge 100a and turning on the second ion gauge 100b.

Figure 3:
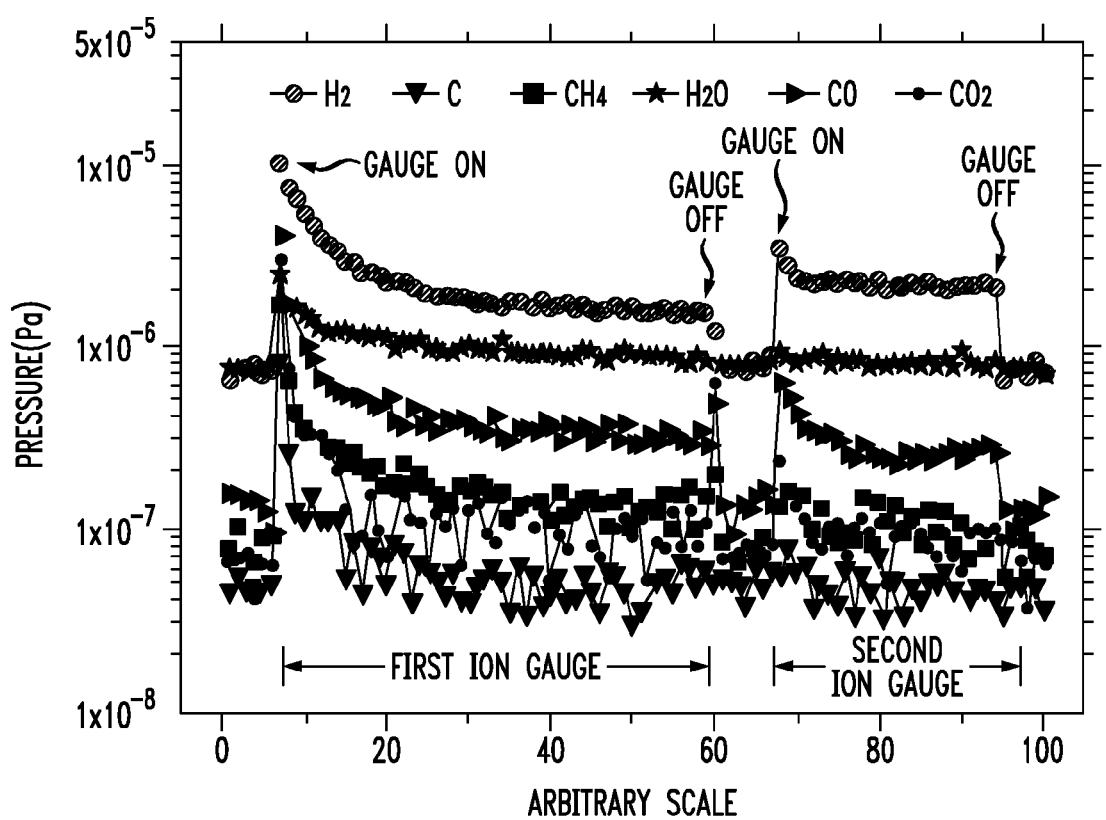

FIG. 3 is a graphic view showing the composition and the pressure of the gas discharged when the first and second ion gauges 100a, 100b are turned on. In FIG. 3, the horizontal axis denotes the scanning time represented by arbitrarily scales, and the vertical axis denotes the pressure of the discharged gas. As shown in the upper portion of the graphic view of FIG. 3, $H_2$, C, $CH_4$, $H_2O$, CO, $CO_2$, which were searched to be largely discharged, were only detected. The first ion gauge and the second ion gauge shown in the horizontal axis were shown in a graph to make it easy to compare what were measured at different times.

Therefore, according to one embodiment of the present invention as described above, it is possible to measure the accurate vacuum pressure by measuring the kind and volume of the gas discharged from the ion gauge qualitatively, which is indispensable to the fabrication process of the semiconductor or high-tech display device.

Also, it is advantageous because it is possible to prevent the occurrence of unexpected chemical reaction during the process by measuring the kind and volume of the discharged gas, to protect other devices of the process, and to improve the quality of the produced product.

Furthermore, according to the present invention, the discharge speed of the pump can be decreased by reducing the conductance between the pressure container 210 and the discharge container 220 by means of mounting the partition 235 with the orifice 230 in the vacuum container 200. Accordingly, it is possible to increase the accuracy of the measurement by stabilizing the inside pressure of the pressure container 210. In addition, it is possible to increase the measurement effect by detecting the gas only discharged from the ion gauge itself because it is possible to remove the moisture or the contamination material in the container previously by mounting the heating plate 250 around the vacuum container 200.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An apparatus for measuring the composition and the pressure of gas discharged from an ion gauge, the apparatus comprising:
    a vacuum container segregated into an upper portion and a lower portion via a partition having an orifice, wherein the upper portion comprises a pressure container (210) and the lower portion comprises a discharge container (220), and further wherein the pressure container is arranged to receive the gas from the ion gauge;
    a residual gas analyzer fluidically coupled to the pressure container for measuring the composition and the pressure of the residual gas;
    pump means fluidically coupled to the discharge container; and
    heating means disposed at the vacuum container for heating the vacuum container to a predetermined temperature.

2. The apparatus according to claim 1, wherein the heating means is an electric heating heater, and heats the vacuum container so that it is within a range of 150° to 250° C.

3. The apparatus according to claim 1, wherein the pump means comprise:
    a turbomolecular pump fluidically coupled to the discharge container; and
    a rotary pump fluidically coupled, in series, to the turbomolecular pump.

4. The apparatus according to claim 3, wherein the turbomolecular pump has a volume capable of maintaining the pressure of the vacuum container at less than $1 \times 10^{-5}$ Pa, and the rotary pump has a volume capable of maintaining the pressure of the vacuum container at less than 1 Pa.

5. The apparatus according to claim 1, wherein a diameter of the orifice is 10 mm when a diameter of the vacuum container is 250 mm.

6. The apparatus according to claim 1, wherein the vacuum container comprises stainless steel material.

7. The apparatus according to claim 6, wherein the partition comprises stainless steel material.

* * * * *